United States Patent [19]

Varadi

[11] Patent Number: 4,924,369
[45] Date of Patent: May 8, 1990

[54] REGULATED BLOCKING CONVERTER WHEREIN SWITCH CONDUCTION TIME INCREASES WITH HIGHER OUTPUT VOLTAGES

[75] Inventor: Werner J. Varadi, Munich, Fed. Rep. of Germany

[73] Assignee: Siemens Aktiengesellschaft, Berlin and Munich

[21] Appl. No.: 271,018

[22] Filed: Nov. 14, 1988

[30] Foreign Application Priority Data

Jan. 26, 1988 [DE] Fed. Rep. of Germany ....... 3802224

[51] Int. Cl.$^5$ .............................................. H02M 3/28
[52] U.S. Cl. ........................................ 363/21; 307/82; 363/71
[58] Field of Search ...................... 363/21, 71; 307/58, 307/82

[56] References Cited

U.S. PATENT DOCUMENTS 4,037,271 7/1977 Keller ..................................... 363/21
4,251,857 2/1981 Shelly ..................................... 363/26
4,620,271 10/1986 Musil ..................................... 363/21
4,704,670 11/1987 Gradl et al. ............................ 363/21

FOREIGN PATENT DOCUMENTS 121366 9/1981 Japan ..................................... 363/21
55-89868 1/1982 Japan ..................................... 363/21
202873 12/1982 Japan ..................................... 363/21
2073918 10/1981 United Kingdom .

Primary Examiner—William H. Beha, Jr.
Attorney, Agent, or Firm—Hill, Van Santen, Steadman & Simpson

[57] ABSTRACT

A feed circuit for feeding at least one user from an impressed direct current. In order to form a feed circuit for feeding at least one user with a dc voltage acquired from an impressed direct current in one stage and to thereby guarantee a power limitation, the feed circuit is formed as a blocking converter having a switch controllable such that the relative on-duration of the switch becomes increasingly longer for higher output voltages.

8 Claims, 2 Drawing Sheets

REGULATED BLOCKING CONVERTER WHEREIN SWITCH CONDUCTION TIME INCREASES WITH HIGHER OUTPUT VOLTAGES

BACKGROUND OF THE INVENTION

The present invention is directed to a feed circuit for feeding at least one user with a dc voltage acquired from an impressed direct current. The feed circuit has a controllable switch in a current branch which is connected in parallel to an input of the feed circuit and that is controllable with a pulse width modulator dependent on a voltage that is the determining factor for the output voltage.

U.S. Pat. No. 4,620,271 discloses such a feed circuit. In the prior art feed circuit, a voltage converter is arranged in iteration with a switching controller. A current sensor for the input current is provided at the input of the voltage converter. The voltage converter is driven with the current sensor and with a control circuit connected to the current sensor such that it outputs a reduced output voltage or, reduced output power for input currents above a predetermined limit value. As a result the feed circuit is largely insensitive to overload conditions. In particular, the prior art feed circuit can automatically return to normal operating condition following an overload condition.

SUMMARY OF THE INVENTION

An object of the present invention is to provide a feed circuit for feeding at least one user with a dc voltage acquired from an impressed direct current such that, apart from a readjustment means or the like that may be provided, is formed in one stage and guarantees a power limitation of the output circuit or output circuits.

In accord and with the present invention, the feed circuit is a blocking converter, whereby the switch is connected in series with a primary winding of a storage transformer. The pulse width modulator is controllable such that, in the range of control of the feed circuit, the relative on-duration of the switch becomes increasingly longer for higher output voltages.

An advantage of the present invention is that the feed circuit generates at least one constant, potential-separated output voltage and, particularly for a low-impedance load, outputs a constant power for output voltages that are lower than the nominal voltage or equal to the nominal voltage.

A power limitation for the output circuit or for the output circuits is expediently provided. There are various possibilities for this. When the feed circuit has the pulse width modulator controllable dependent on the input voltage, the input voltage is limited to that value that corresponds to the maximum power, then a control of the power consumption to a constant value advantageously results, so that a nearly constant output power results due to the efficiency for high load or for low load resistors.

There are various possibilities of controlling the output voltage such that it has a constant value.

In the improvement of the feed circuit wherein a source for the voltage that is the determining factor for the output voltage is formed by a first further winding of the storage transformer, the e.m.f. is controlled such that it has a constant value.

A feed circuit wherein a further winding is provided as source for a voltage proportional to the input voltage, provides for limitation of the input voltage.

In a further embodiment the feed circuit has two current branches respectively composed of one of the two first and second further windings of the storage transformer and of first and second diodes, respectively, connected in series therewith which are connected parallel to one another such that the same type of electrodes of the two diodes are connected together. A parallel circuit of the two current branches and a capacitor connected parallel thereto is connected between a reference potential input and an actual value input of a control comparator. This feed circuit has the advantage that only a single control comparator is required for controlling the e.m.f. and for limiting the input voltage.

A feed circuit that provides a simple structure of the transformer has the actual value input of a control comparator preceding the pulse width modulator connected via a third diode to the tap of a voltage divider connected in parallel to the input and to the tap of a further third voltage divider connected to an auxiliary voltage. The further third voltage divider contains an emitter-collector path of an opto-coupler controllable by the output voltage.

A limitation of the output current can be provided instead of the limitation of the power by a feed circuit wherein the pulse width modulator is additionally controllable dependent on the output current of the feed circuit such that the relative oneduration of the switch becomes increasingly longer for higher output currents. In this case, the output power decreases for decreasing load resistance, so that the output power cannot exceed a prescribed, upper limit. The potential separation between the input power circuit and the output power circuit is thereby particularly assured when the control input of the opto-coupler preceding the pulse width modulator is preceded by two control comparators connected together via fifth and sixth diodes one control comparator having an input connected to the tap of a voltage divider which is connected across the output of the feed circuit and the other control comparator having an input connected to a current sensor through which flows the output current.

The feed circuit is especially suitable for use in a means for remote feed of intermediate locations in equipment of electrical or electro-optical communications transmission technology.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENTS

Figure 1:
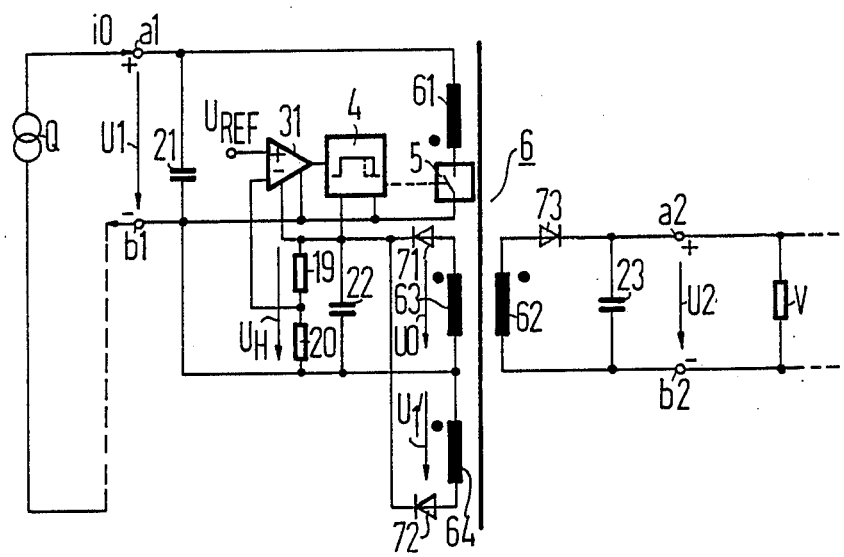
FIG. 1 is a circuit diagram of a blocking converter feed with constant current and having control of the no-load voltage and limitation of the input voltage.

The feed circuit shown in FIG. 1 for feeding the user V generates an output voltage U2 from current i0. Particularly in remote feed devices having dc series feed, the feed circuit can supply one or more users with voltage in remotely fed intermediate locations. The input a1, b1 is in series with further, identical feed circuits (not shown) in a remote feed circuit into which the constant current source Q feeds the constant current i0.

The feed circuit is a blocking converter supplied with constant current. In this blocking converter, a series circuit composed of a primary winding 61 of a storage transformer 6 and a controllable switch 5 is connected to the input a1, b1 of the feed circuit. The controllable switch 5 is in a current branch in parallel to the input a1, b1 of the feed circuit. Further, a capacitor 21 is connected to the input a1, b1 of the feed circuit.

The series circuit composed of diode 73 and of capacitor 23 is connected to a secondary winding 62 of the transformer 6. The diode 73 is polarized such that it is conductive for an inhibited switch 5 and is inhibited for a conductive switch 5. The output a2, b2 of the feed circuit to which the user V is connected is in parallel to the capacitor 23. A plurality of users can be supplied with a constant voltage instead of user V. Moreover, the blocking converter can have further secondary circuits for feeding further users, preferably secondary circuits that are constructed like the secondary circuit composed of the secondary winding 62, of the diode 73 and of the capacitor 23.

The blocking converter is provided with a control circuit by which a no-load voltage or e.m.f. is controlled so that it has a constant value. The auxiliary voltage $U_H$ across capacitor 22 serves as a measure of the no-load voltage. This auxiliary voltage $U_H$ is conducted to the operating voltage inputs of the control capacitor 21 and to the pulse width modulator 4 as a supply voltage and is supplied to the control comparator 31 as an actual value via the voltage divider composed of the resistors 19 and 20. The control comparator 31 controls the pulse width modulator 4. The switch 5 that can be a semiconductor switch or a power field effect transistor is placed into its conductive condition and into its inhibited condition by the pulse width modulator 4.

The capacitor 22 is connected to a first further winding 63 of the transformer 6 via the diode 71. The diode 71 is polarized such that it is inhibited for a conductive switch 5 and is conductive for an inhibited switch 5. The voltage $U_H$ is therefore a measure of the no-load voltage U0 or e.m.f. that is in turn the determining factor for the output voltage U2 from which the user V is supplied.

The control comparator 31 is an operational amplifier that has its reference potential input connected directly to the input terminal b1 and has its positive input connected to the reference voltage URef. A terminal of the capacitor 22 is likewise connected to the input terminal b1, i.e. to a reference potential. The other terminal of the capacitor 22 is connected via a voltage divider 19, 20 to the negative input of the control comparator 31 which is an actual value input.

The pulse width modulator 4 is in turn controlled by the control comparator 31 such that the pulse-to-pause ratio of the control pulse sequence is varied dependent on the deviation. The pulse width modulator 4 is controlled by the control comparator 31 such that, in the range of control of the feed circuit, the relative on-duration of the switch 5 becomes increasingly longer for higher auxiliary voltages $U_H$ and, also for higher output voltages U2. In particular, the duration of the control pulses is varied for a fixed pulse repetition rate.

When the input voltage U1 that arises at the capacitor 21 exceeds a prescribed value, then the input voltage U1 is limited. In this case, the pulse width modulator 4 is controlled as a function of the input voltage U1, namely such that the relative on-duration of the controllable switch 5 becomes increasingly longer for higher input voltages U1. In this case, the voltage U1' induced at a second further winding 64 is higher than the no-load voltage U0 and, instead of the no-load voltage U0, a voltage U1' proportional to the input voltage U1 of the feed circuit becomes the actual value, this voltage U1' being supplied by the winding 64 of the transformer 6.

The auxiliary voltage $U_h$ coupled to the output voltage U2 and the voltage U1' coupled to the input voltage U1 take effect alternatively since the two current branches are connected in parallel to the capacitor 22.

In a first current branch, the diode 71 is connected in series with the winding 63; in a second current branch, the diode 72 is connected in series with the winding 64. These two current branches are connected parallel to one another. In this parallel circuit, the cathodes, i.e. the electrodes of the diodes 71 and 72 are connected to one another. Further, the end of the winding 63 is connected to the start of the winding 64, i.e. opposite terminals of the windings 63 and 64 are connected together.

When the switch 5 is closed, then the diodes 71 and 73 are inhibited and the diode 72 is conductive. When the switch 5 is open, then the diode 72 is in its inhibited condition and the diodes 71 and 73 conduct. When the switch 5 is closed, then the input voltage U1 is connected across the winding 64. When, by contrast, the switch 5 is open, then the transformed output voltage appears at the winding 63.

The diodes 71 and 72 have their cathodes connected to the negative input of the control comparator 31 and therefore effect whichever one of the transformed output voltage U2 and the transformed input voltage U1' is higher as the actual value.

The pulse-width-controlled blocking converter generates the constant output voltage U2 from the constant current i0. Via the diode 71, the winding 63 supplies the control circuits of the blocking converter and forms the actual value for the control circuit. Since the turns ratio of the windings 61 and 62 is constant, the output voltage U2 is thus held practically constant during regular operation. The voltage across the winding 64 is coupled with the input voltage U1 via the turns ratio of the windings 64 and 61.

For an excessively low load resistance of the user V, the voltage at the winding 64 becomes higher than the voltage at the winding 63. In this case, the pulse width control controls the input voltage U1. For a set impressed current i0, this corresponds to a constant power consumption and to a nearly constant output power. The feed of the control circuits also occurs with a constant, i.e. controlled voltage when the output voltage U2 has dropped.

Figure 2:
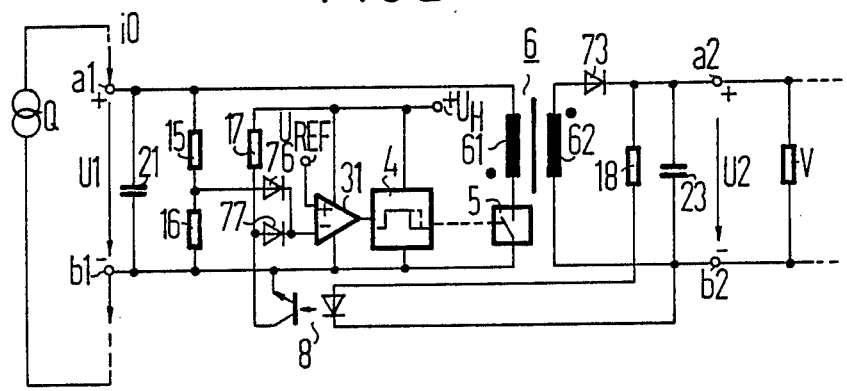
FIG. 2 is an alternative circuit diagram of a blocking converter feed with constant current and having control of the output voltage and limitation of the input voltage.

The feed circuit of FIG. 2 largely coincides with that of FIG. 1, except for the formation of the actual value supplied to the control comparator 31.

The negative input of the control comparator 31, which is the actual value input, is connected via diode 76 to a tap of a voltage divider that is composed of resistors 15 and 16 and which is connected to the input a1, b1 of the feed circuit. Via the diode 77, the negative input of the control comparator 31 also is connected to the tap of a further voltage divider. This further voltage divider is composed of resistor 17 and of the collector-emitter path of opto-coupler 8. The resistor 17 is connected between an auxiliary voltage $+U_H$ and the opto-coupler 8. The emitter of the opto-coupler 8 is connected to the reference potential or to the terminal b1 of the input. The light-emitting diode of the opto-coupler 8 is connected via resistor 18 to the output a2, b2 of the feed circuit. It is polarized in the conducting direction for the output voltage U2.

The diodes 76 and 77 have their cathodes connected to the negative input of the control comparator 31 and therefore effect whichever one of the transmitted and divided output voltage U2 and the divided input voltage U1 is higher as the actual value.

In particular, the auxiliary voltage $U_h$ can be generated by a further output circuit that is not shown in the figure. This is also true of the operating voltage that is equal to the auxiliary voltage $+U_H$ in the illustrated example.

On the other hand, the feed circuits from FIG. 1 and FIG. 2 and be advantageously combined, for example in a fashion such that the input voltage is controlled by the voltage divider 15, 16 of FIG. 2 and the output voltage is controlled by the e.m.f. winding 63 of FIG. 1 that generates the auxiliary voltage.

Figure 3:
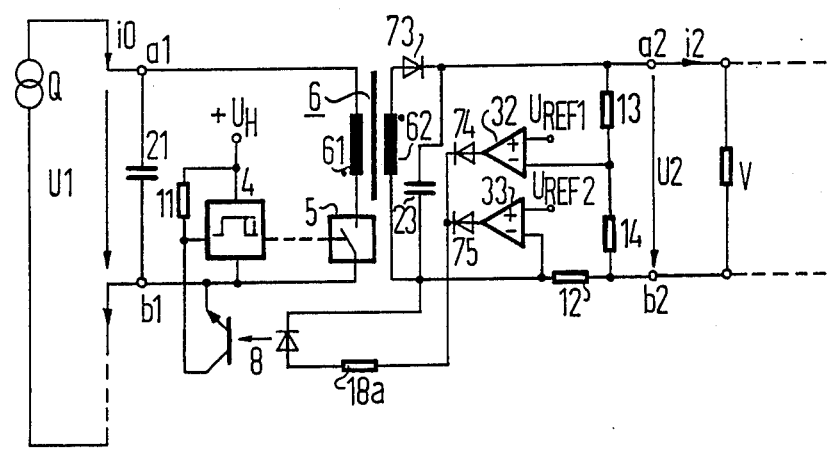
FIG. 3 is a further circuit diagram of a blocking converter feed with constant current and having control of the output voltage and limitation of the output current.

The feed circuit shown in FIG. 3 largely coincides with that of FIG. 1, except that the pulse width modulator 4 is controlled not via one of two further windings of the transformer 6 but, in the operating state of the voltage control, by the output voltage U2 of the feed circuit itself and, in the operating state of the power limitation, by the output current i2 of the feed circuit. The control of the pulse width modulator 4 by the output current i2 results in the relative on-duration of the switch 5 becoming increasingly longer for higher output currents i2.

The voltage divider composed of the resistors 13 and 14 is connected in parallel to the output a2, b2 of the feed circuit. The resistor 13 is connected to the start of the secondary winding 62 via the diode 73; the resistor 14 is connected to the end of the secondary winding 62 via the resistor 12.

The control input of the pulse width modulator 4 is preceded by the two control comparators 32 and 33 each of which is formed by an operational amplifier. The outputs of the control comparators 32 and 33 are connected together via the two diodes 74 and 75. The junction of the diodes 74 and 75 is connected via the resistor 18a and the light-emitting diode of the optocoupler 8 to a reference potential, namely to that terminal of capacitor 23 opposed from diode 73. The emitter-collector path of the opto-coupler 8 is connected to the terminal b1 by the emitter, is directly connected to the control 1 input of the pulseduration modulator 4 by the collector and is connected to the auxiliary voltage $+U_H$ via resistor 11. In particular, the auxiliary voltage $+U_H$ can be generated by a further output circuit.

The control comparator 32 has its actual value input or negative input connected to the tap of the voltage divider composed of the resistors 13 and 14. The reference voltage $U_{Ref2}$ is connected to its positive input. The actual value input or positive input of the control comparator 33 is connected to that terminal of the resistor 12 which is connected to the secondary winding 62. The reference voltage $U_{Ref2}$ is connected to the negative of the control comparator 33. The output current i2 flows in resistor 12 and forms a current sensor for the output current i2.

The diodes 74 and 75 have their cathodes connected to the anode of the light-emitting diode of the optocoupler 8 and effect whichever one of the divided output voltage U2 and the voltage drop across the resistor 12 would be the first to exceed the reference value without control. The divided output voltage U2 thereby acts as an actual value for the voltage control and the voltage drop across the resistor 12 acts as the actual value for the current limitation.

The feed circuit is especially suited for use in equipment for remote feed of intermediate locations in devices of electrical or electro-optical communications technology.

A plurality of users can be advantageously supplied per intermediate location via a common remote feed line by a remote feed means for light waveguide regenerators.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

I claim:

1. A feed circuit for feeding at least one user with a dc voltage acquired from an impressed direct current, having a controllable switch in a current branch which is connected in parallel to an input of the feed circuit and that is controllable with and that is connected to an output of a pulse width modulator dependent on a voltage that is the determining factor for an output voltage of the feed circuit comprising: the feed circuit being a blocking converter, whereby the switch is connected in series with a primary winding of a storage transformer in the current branch; and the pulse width modulator being controllable by a means for a controlling coupled to the primary winding and which provides the voltage that is the determining factor such that, in a range of control of the feed circuit, a relative on-duration of the switch becomes increasingly longer for higher output voltages.

2. The feed circuit according to claim 1, wherein for input voltages at the input that exceed a set value, the pulse width modulator is controllable dependent on the input voltage such that the relative on-duration of the switch becomes increasingly longer for higher input voltages.

3. The feed circuit according to claim 2, wherein a source for the voltage that is the determining factor for the output voltage is formed by a first further winding of the storage transformer.

4. The feed circuit according to claim 3, wherein a second further winding is provided as a source for a voltage proportional to the input voltage.

5. The feed circuit according to claim 4, wherein two current branches respectively composed of one of the two first and second windings of the storage transformer and of first and second diodes, respectively, connected in series therewith are connected parallel to one another such that the same type of electrodes of the two first and second diodes are connected together; and wherein a parallel circuit composed of the two current branches and a capacitor connected in parallel thereto is connected between a reference potential input and an actual value input of a control comparator, an output of the control comparator being connected to an input of the pulse width modulator.

6. The feed circuit according to claim 2, wherein an actual input of a control comparator preceding the pulse width modulator is connected via a diode to a tap of a voltage divider connected in parallel to the input and via another diode to the tap of a further voltage divider connected to an auxiliary voltage; and wherein the further voltage divider contains an emitter-collector path of an opto-coupler controllable by the output voltage.

7. The feed circuit according to claim 1, wherein the pulse width modulator is additionally controllable dependent on an output current of the feed circuit such that the relative on-duration of the switch becomes increasingly longer for higher output currents.

8. The feed circuit according to claim 7, wherein a control input of an opto-coupler preceding the pulse width modulator is preceded by two control comparators having outputs connected together via a respective diode, one control comparator having an input connected to the tap of a voltage divider which is connected across the output of the feed circuit and the other control comparator having an input connected to a current sensor through which flows the output current.

* * * * *